United States Patent
Wu et al.

(10) Patent No.: US 7,109,692 B1
(45) Date of Patent: Sep. 19, 2006

(54) HIGH-SPEED PWM CONTROL APPARATUS FOR POWER CONVERTERS WITH ADAPTIVE VOLTAGE POSITION AND ITS DRIVING SIGNAL GENERATING METHOD

(75) Inventors: Chung-Cheng Wu, Tao Yuan (TW); Qin Huang, Apex, NC (US); Xiao-Ming Duan, Apex, NC (US)

(73) Assignees: Niko Semiconductor Co., Ltd., Taipei (TW); Power Management Associates LLC, Apex, NC (US)

( * ) Notice: Subject to any disclaimer, the term of this patent is extended or adjusted under 35 U.S.C. 154(b) by 0 days.

(21) Appl. No.: 11/286,321

(22) Filed: Nov. 25, 2005

(30) Foreign Application Priority Data

Sep. 5, 2005 (TW) .............................. 94130389 A

(51) Int. Cl.
*G05F 1/40* (2006.01)
(52) U.S. Cl. ...................... 323/282; 323/283
(58) Field of Classification Search ................ 323/282, 323/283, 284, 285, 288, 351
See application file for complete search history.

(56) References Cited

U.S. PATENT DOCUMENTS 6,100,677 A * 8/2000 Farrenkopf ................. 323/285
6,621,256 B1 * 9/2003 Muratov et al. ............. 323/282
6,977,830 B1 * 12/2005 Lee et al. ..................... 363/89
7,061,213 B1 * 6/2006 Yoshida ....................... 323/224

\* cited by examiner

*Primary Examiner*—Adolf Berhane
(74) *Attorney, Agent, or Firm*—Rosenberg, Klein & Lee

(57) ABSTRACT

A high-speed PWM control apparatus with adaptive voltage position and a driving signal generating method thereof is provided. The present invention automatically detects a change in the loading and adjusts the voltage position instantaneously for stabilizing the voltage and reducing the loading output power consumption. The present invention does not require a clock signal to generate a driving signal and does not require an error amplifier to control the modulation. Therefore, the present invention has a fast transient response that responds to the change of the loading instantaneously and has a stabilizing effect. When the apparatus is on a continuous conduction mode (CCM), the switching frequency of the controller is still fixed even though the input voltage Vin and the output voltage Vout are changed. The electrical-magnetic noise disturbance is improved.

13 Claims, 13 Drawing Sheets

HIGH-SPEED PWM CONTROL APPARATUS FOR POWER CONVERTERS WITH ADAPTIVE VOLTAGE POSITION AND ITS DRIVING SIGNAL GENERATING METHOD

BACKGROUND OF THE INVENTION

1. Field of the Invention

The present invention relates to a fast transient response PWM control apparatus for a voltage regulator with adaptive voltage position and its driving signal generating method. In particular, this invention is used for a switching DC—DC power converter apparatus. The present invention detects changes in the loading instantaneously and creates a response rapidly to stabilize the output voltage.

2. Description of the Related Art

Control methods for a switching DC—DC power converter are typically divided into two types. One uses clock signals as the frequency for controlling the switching of the power devices. Another one does not use a clock signal to control the switching of the power devices in the DC—DC converter. When using a clock signal, the frequency of the switching signal of the DC—DC converter is fixed and is the same as the frequency of the clock signal. The duty cycle (D) of the switching signal, defined as $$D = \frac{T_{on}}{T_{on} + T_{off}},$$

varies according to the feedback control, moving either the leading-edge or the trailing edge of the signal to achieve pulse width modulation (PWM), For the modulation using a fixed clock signal to generate the switching signal, the modulation of the switching signal is limited due to the response time of the clock signal because even the fastest response change still need to wait for one cycle. Hence the switching signal cannot respond to the change of the loading instantaneously if the loading changes rapidly. Furthermore, the feedback loop, which controls the duty cycle change speed, is related to the control bandwidth. The latter has to be designed based on trade-off with the stability requirement.

For solving the above problem, another technology for controlling the switch of the DC—DC converter does not need the clock signal. It adopts a hysteretic control method or a constant on-time control method.

Please refer to FIG. 1, which shows a schematic block diagram of the DC—DC power converter having a hysteretic control of the prior art. The DC—DC power converter having a hysteretic control 1 is composed of a hysteretic comparator 10 connected with a driving unit 12, an energy storage inductor L and an energy storage capacitor C. The hysteretic comparator 10 obtains a feedback signal Vfb from the output port of the DC—DC power converter circuit 1 and compares it with a hysteretic boundary value VH to output a driving signal Vdriver. The driving signal Vdriver is used for controlling a switch (not shown in the figure) of the driving unit 12 and a stable output voltage Vout is generated according to an input voltage Vin.

Please refer to FIGS. 1 and 2. FIG. 2 shows the typical waveforms of the DC—DC power converter having a hysteretic control of the prior art. When the feedback signal Vfb on decreasing reaches the lower boundary value −VH of the hysteretic boundary value VH, the driving signal Vdriver is changed from a low level to a high level. When the feedback signal Vfb on increasing reaches the upper boundary value +VH of the hysteretic boundary value VH, the driving signal Vdriver is changed from a high level to a low level. Via the above method, a driving signal is generated. The feedback signal for the hysteretic control is typically the output voltage, which has ripples due to the effective series resistor (ESR) and pulsating charging and discharging currents. The generated ripples affect the accurate operation of the hysteretic comparison and make the switching frequency of the driving signal Vdriver change rapidly. When the level of the ripples is small, the disturbance of the noise is serious and the method does not work well in low ripple and high-accuracy application.

Please refer to FIG. 3, which shows a schematic block diagram of the DC—DC power converter having a constant on-time control of the prior art. The DC—DC power converter circuit usually adopts a voltage control mode. Using a buck DC—DC power converter 2 as an example, in the DC—DC power converter 2, the control circuit 20 uses an error amplifier 23 to obtain a feedback voltage signal $V_{FB}$. Then, the feedback voltage signal $V_{FB}$ is compared with a reference voltage Vref to amplify and output an error signal VE. A PWM comparator compares the error signal VE and an integration output signal Vramp to output a PWM setting signal PWMset to a flip-flop 26 for enabling an output driving signal PWMDRV of the flip-flop 26.

The enabled output-driving signal PWMDRV controls an on-time control unit 28 to delay a fixed period and output a delay signal DelayOn. The delay signal Delay-On controls the reset of the flip-flop 26 via an OR gate 27 and obtains an output-driving signal PWMDRV having a fixed on-time at the output port Q of the flip-flop 26. The output driving signal PWMDRV outputs a pair of driving signals DrvH and DrvL that are complementary via a driving unit 29. The complementary driving signals DrvH and DrvL is used for driving the switch of transistors Q1 and Q2. By a pulse width modulation method, the output voltage Vout of a power output circuit 22 is stable.

The control circuit 20 includes an over-current protection unit 24 for receiving a current detection signal Vs. The current detection signal Vs is compared with a critical signal Vthocp to output an over-current signal OCPen. The over-current signal OCPen and the delay signal DelayOn pass through the OR gate 27 to control the reset of the flip-flop 26 for obtaining the output-driving signal PWMDRV having a fixed on-time.

Please refer to FIG. 4, which shows waveforms diagram of the circuit block in the FIG. 3. The error signals VE is compared with the integration output signal Vramp to output a PWM setting signal PWMset for enabling the driving signal PWMDRV. The PWM setting signal PWMset enables the on-time control unit 28. After a fixed delay time Ton, the on-time control unit 28 resets the driving signal PWMDRV.

Please refer to FIG. 3 again. In the fixed on-time control method, the on-time for switching period driving signal is fixed and the off-time is controlled by the modulation of the error amplifier 23. In other words, the fixed on-time makes the modulation of the off-time become influenced by the change of the output or input voltage of the DC—DC power converter 2. Therefore, the switching frequency is changed. In the buck DC—DC power converter 2, the switching frequency fs is affected by the output voltage Vout and the input voltage Vin when the on-time is fixed. Please refer to formula (1).

$$fs = \frac{Vout}{Ton \times Vin} \quad (1)$$

Furthermore, the fixed on-time control method needs to use the error amplifier 23 to control the modulation. The transient response of the control signal is affected by the limitations of the bandwidth of the error amplifier 23.

SUMMARY OF THE INVENTION

One particular aspect of the present invention is to provide a high-speed PWM control apparatus for power converter with adaptive voltage position and its driving signal generation method. The present invention automatically detects the change of the loading and adjusts the voltage position simultaneously for stabilizing the voltage. When the circuit recovers from a heavy loading to a light loading, the present invention prevents the over-shoot of the loading from being produced. Therefore, the circuit components, such as output capacitor, the inductor and the power transistor etc., can be reduced. Therefore, the cost of the component is reduced.

The present invention does not require the frequency of clock signal to generate a driving signal and does not require an error amplifier to control the modulation. Therefore, the present invention has a fast transient response that responds to the change of the loading instantaneously and stably. When the apparatus is in continuous conduction mode (CCM), the switching frequency of the controller is still fixed even though the input voltage Vin and the output voltage Vout are changed. The electrical-magnetic noise disturbance is therefore improved.

The high-speed PWM control apparatus with adaptive voltage position is used in a DC—DC power converter. The high-speed PWM control apparatus with adaptive voltage position includes an auto-loading voltage position slope compensation unit, an error signal comparison unit, a logic control unit, an on-time delay control unit, a flip-flop, a driving unit, an off-time delay control unit and a zero current detection unit.

The compensation unit is used for obtaining a current detection signal and automatically outputs a feedback voltage-adjusting signal according to the current detection signal. The error signal comparison unit is connected with the compensation unit for comparing the feedback voltage-adjusting signal with a reference signal to output a modulation output signal. The logic control unit is connected with the error signal comparison unit for receiving the modulation output signal and outputting a PWM setting signal. The on-time delay control unit is connected with the logic control unit, the input voltage Vin and the reference voltage Vref for generating a PWM reset signal according to the PWM setting signal, the input voltage Vin and the reference voltage Vref. The flip-flop is connected with the logic control unit and the on-time delay control unit for outputting a PWM driving signal according to the PWM setting signal and the PWM reset signal. The PWM driving signal outputs a pair of complementary driving signals DrvH and DrvL via the driving unit. The off-time delay control unit is connected with the flip-flop and the logic control unit for generating a PWM off-time signal according to the PWM driving signal and transmitting the PWM off-time signal to the logic control unit. When the zero current detection unit detects the current flowing through the inductor is zero, the zero current detection unit outputs a zero current enable signal to the driving unit for cutting off the driving signal DrvL of the driving unit. Therefore, an unstable condition of output voltage drop that is produced by a reverse current flowing through the transistor is avoided. Thereby, when the loading is changed, the PWM control apparatus generates the PWM setting signal instantaneously to response rapidly the change of the loading. The power supply is therefore stabilized.

A driving signal generating method of the proposed high-speed PWM control apparatus with adaptive voltage position of the present invention is used for controlling a DC—DC power converter. The steps includes: detecting a change of the loading for automatically generating a feedback voltage adjusting signal; comparing the feedback voltage adjusting signal with a reference signal to generate a modulation output signal; calculating logically the modulation output signal and a PWM off-time signal to generate a PWM set signal and the PWM set signal enable and generating a driving signal; delaying and generating a PWM reset signal according to the PWM set signal, an input voltage and a reference voltage to reset the driving signal.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
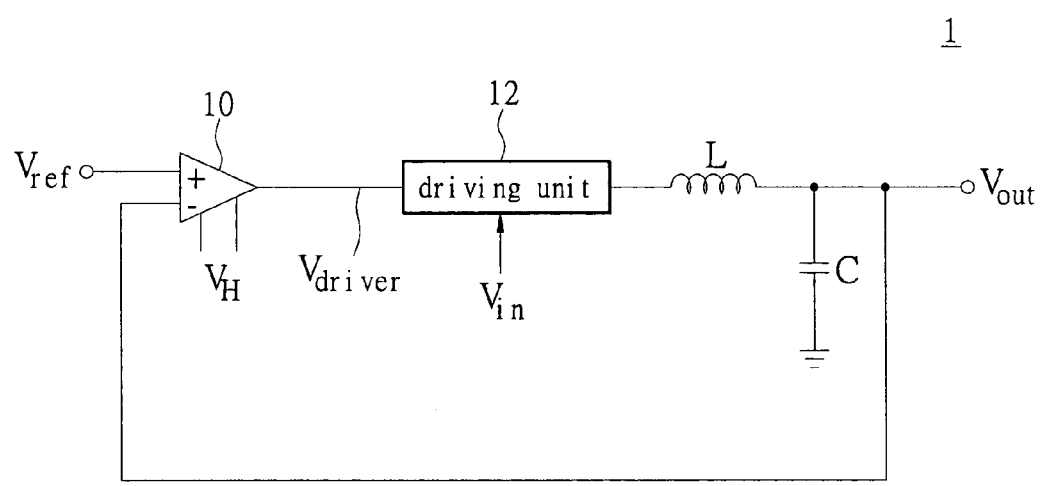
FIG. 1 is a schematic block diagram of the DC—DC power converter having a hysteretic control of the prior art.
Figure 2:
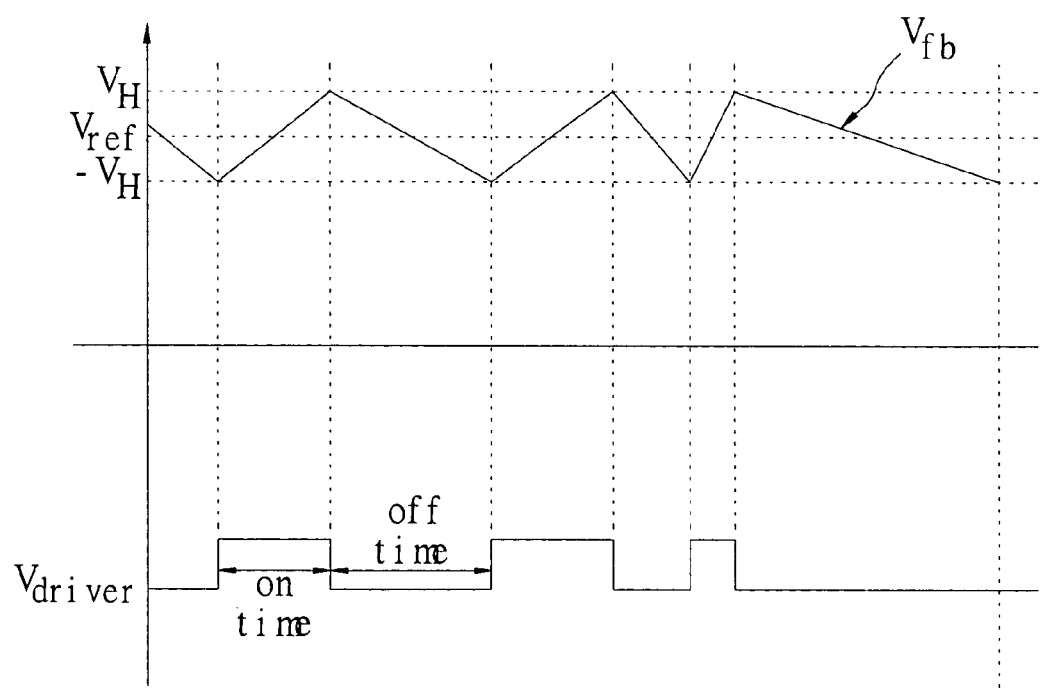
FIG. 2 is a schematic diagram of waveforms of the DC—DC power converter having a hysteretic control of the prior art.
Figure 3:
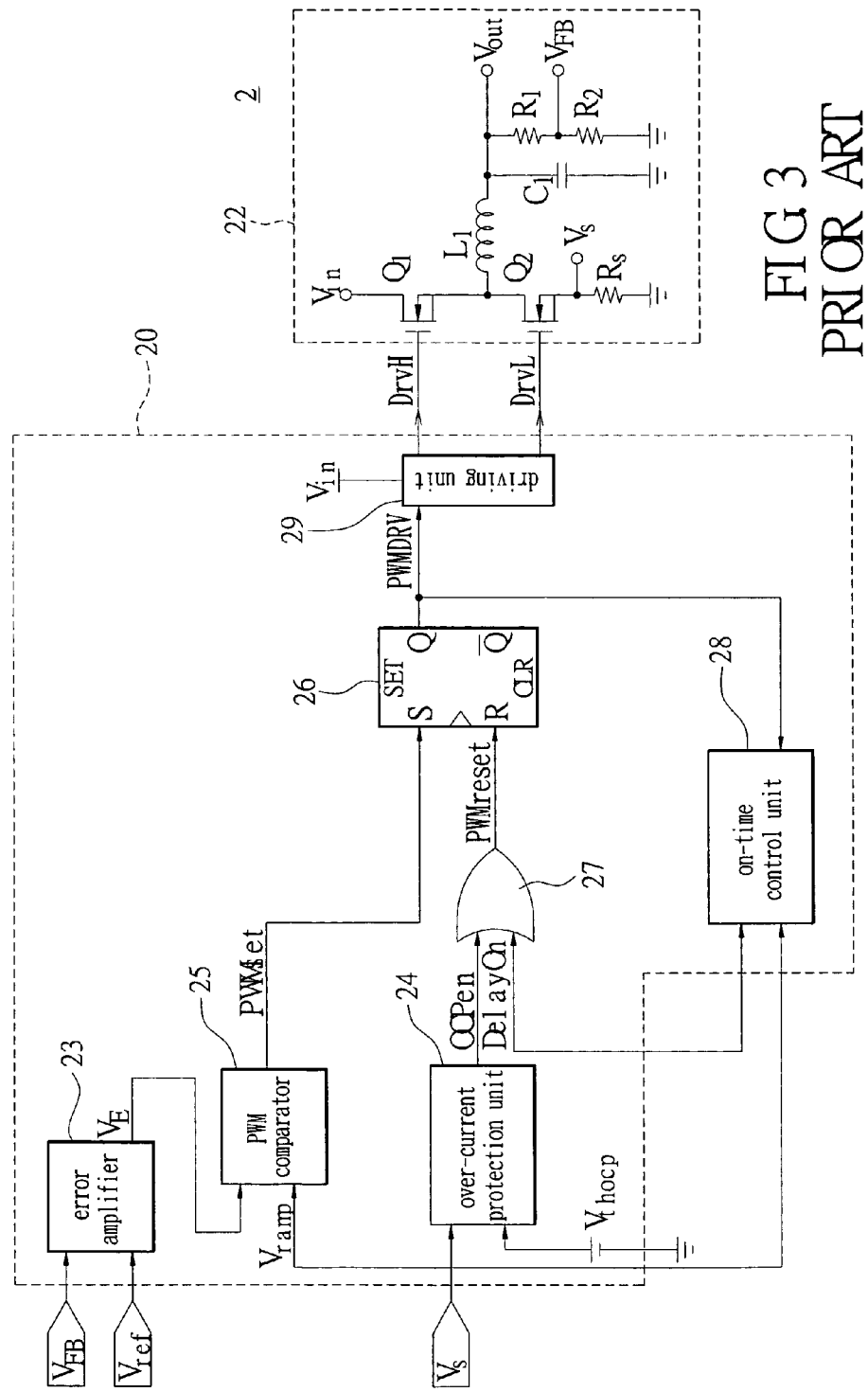
FIG. 3 is a schematic block diagram of the DC—DC power converter having a constant on-time control of the prior art.
Figure 4:
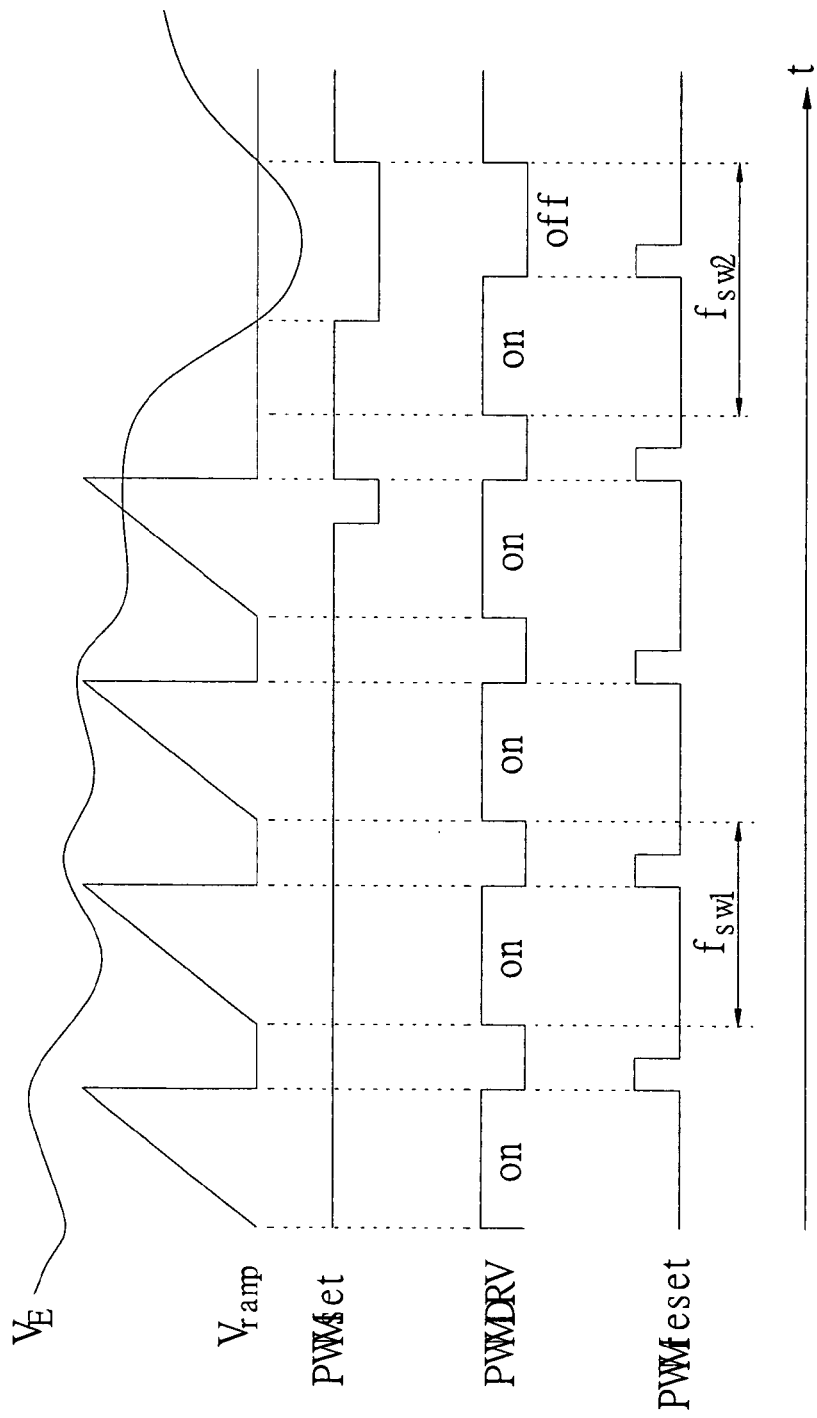
FIG. 4 is a waveform diagram of the circuit block in the FIG. 3.
Figure 5:
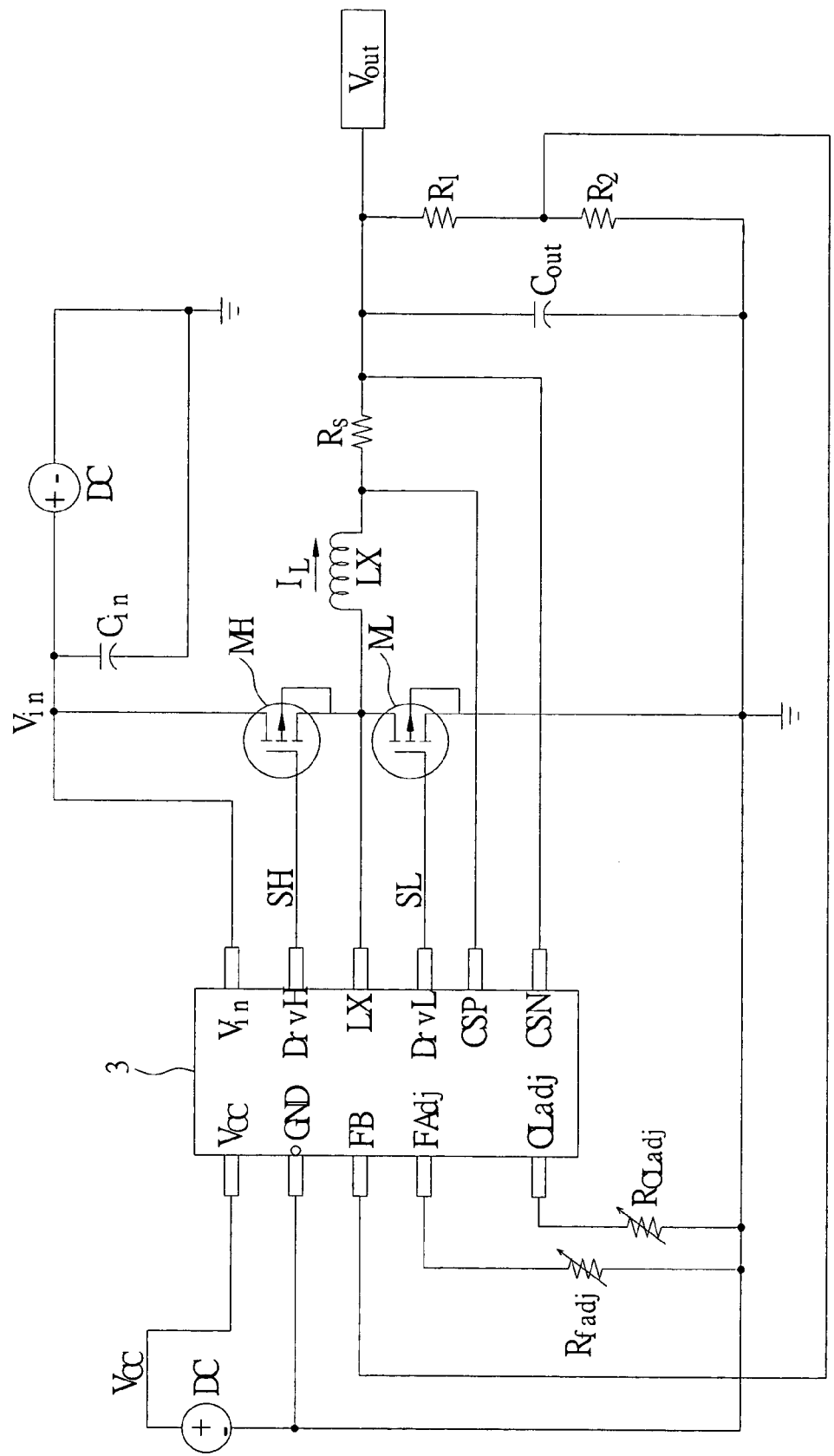
FIG. 5 is a circuit structure diagram of the high-speed PWM control apparatus with adaptive voltage position used in a buck voltage DC—DC converter circuit of the present invention.

Please refer to FIG. 5, which a circuit structure diagram of the high-speed PWM control apparatus with adaptive voltage position used in a buck voltage DC—DC converter circuit of the present invention. The present invention integrates an active loading detection with the high-speed PWM control apparatus with adaptive voltage position 3. The present invention obtains a current detection signal from a detection resistor Rs via two signal inputs CSN and CSP and obtains a voltage feedback signal Vfb from an output divide-voltage resistor R2 via a feedback port FB (when the output voltage Vout is low, the voltage feedback signal Vfb is obtained directly from the output voltage Vout). In the high-speed PWM control apparatus with adaptive voltage position 3, the voltage feedback signal Vfb is added with a compensation voltage signal Vslope to generate a feedback voltage adjusting signal Vfb'. A port FAdj of the high-speed PWM control apparatus with adaptive voltage position 3 is connected with an adjustable resistor Rfadj for adjusting the on-time signal in the high-speed PWM control apparatus with adaptive voltage position 3. Therefore, the switching frequency is changed.

Via the above detection, feedback and adjustment, the output port DrvH and DrvL of the high-speed PWM control apparatus with adaptive voltage position 3 individually output a driving signal SH and SL to control the switch of the transistors MH and ML for providing a stable output voltage Vout. The high-speed PWM control apparatus with adaptive voltage position 3 of the present invention can be implemented in a buck voltage DC—DC converter circuit and a boost voltage DC—DC converter circuit or other DC—DC converters. Furthermore, the high-speed PWM control apparatus with adaptive voltage position 3 of the present invention also can be implemented in a synchronous, an asynchronous, a single phase or a multi phase DC—DC converter circuit.

Figure 6:
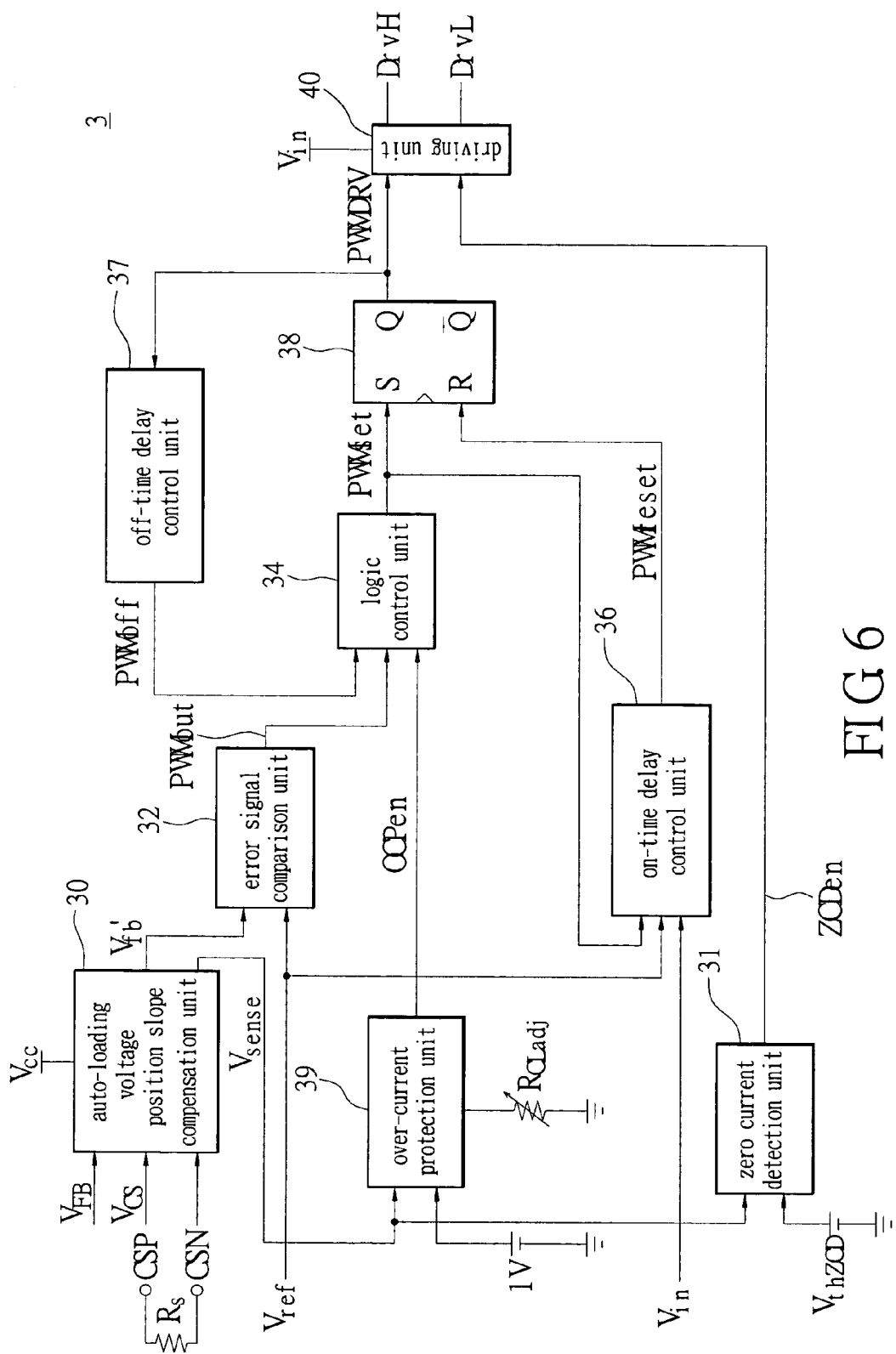
FIG. 6 is a circuit block schematic diagram of the high-speed PWM control apparatus with adaptive voltage position of the present invention.

Please refer to FIG. 6, which shows a circuit block schematic diagram of the high-speed PWM control apparatus with adaptive voltage position of the present invention. The high-speed PWM control apparatus with adaptive voltage position 3 comprises at least one auto-loading voltage position slope compensation unit 30 for obtaining a current detection signal Vcs and a feedback voltage signal VFB. The compensation unit 30 automatically adjusts and outputs a feedback voltage adjusting signal Vfb' according to the current detection signal Vcs and the feedback voltage signal VFB. The feedback voltage adjusting signal Vfb' is transmitted to an error signal comparison unit 32. The error signal comparison unit 32 compares the feedback voltage adjusting signal Vfb' with a reference signal Vref to output a modulation output signal PWMout. A logic control unit 34 receives the modulation output signal PWMout and outputs a PWM setting signal PWMset.

An on-time delay control unit 36 is connected with the logic control unit 34, the input voltage Vin and the reference voltage Vref for generating a PWM reset signal PWMreset according to the PWM setting signal PWMset, the input voltage Vin and the reference voltage Vref. A flip-flop 38 is connected with the logic control unit 34 and the on-time delay control unit 36 for outputting a PWM driving signal PWMDRV according to the PWM setting signal PWMset and the PWM reset signal PWMreset. The PWM driving signal PWMDRV outputs a pair of complementary driving signals DrvH and DrvL via a driving unit 40. An off-time delay control unit 37 is connected with the flip-flop 38 and the logic control unit 34 for generating a PWM off-signal PWMoff according to the PWM driving signal PWMDRV and transmitting the PWM off-signal PWMoff to the logic control unit 34. A zero current detection unit 31 is connected with the compensation unit 30 and the driving unit 40 for comparing an amplified current detection signal Vsense with a zero current boundary value Vthzcd for outputting a zero current enable signal ZCDen to the driving unit 40. The zero current enable signal ZCDen is used for control the driving signal DrvL outputted from the driving unit 40 and prevents the output voltage from dropping due to a reverse current.

Thereby, when the loading is changing, the high-speed PWM control apparatus with adaptive voltage position 3 detects the change of the loading instantaneously to adjust the slope Vslope of the feedback voltage-adjusting signal and is compared by the error comparator 32 to generate the PWM set signal PWMset. The PWM set signal enables the PWM driving signal PWMDRV to enter on-time status. After a period of on-time status, the on-time delay control unit 36 resets the PWM driving signal PWMDRV to enter off-time status for reacting rapidly to the change of the loading and providing a stable power supply. When the PWM reset signal PWMreset is generated, the off-time delay control unit 37 controls the logic control unit 34 to delay a period of time that the PWM set signal will be generated again and acts as the off time of the PWM driving signal PWMDRV.

Figure 11:
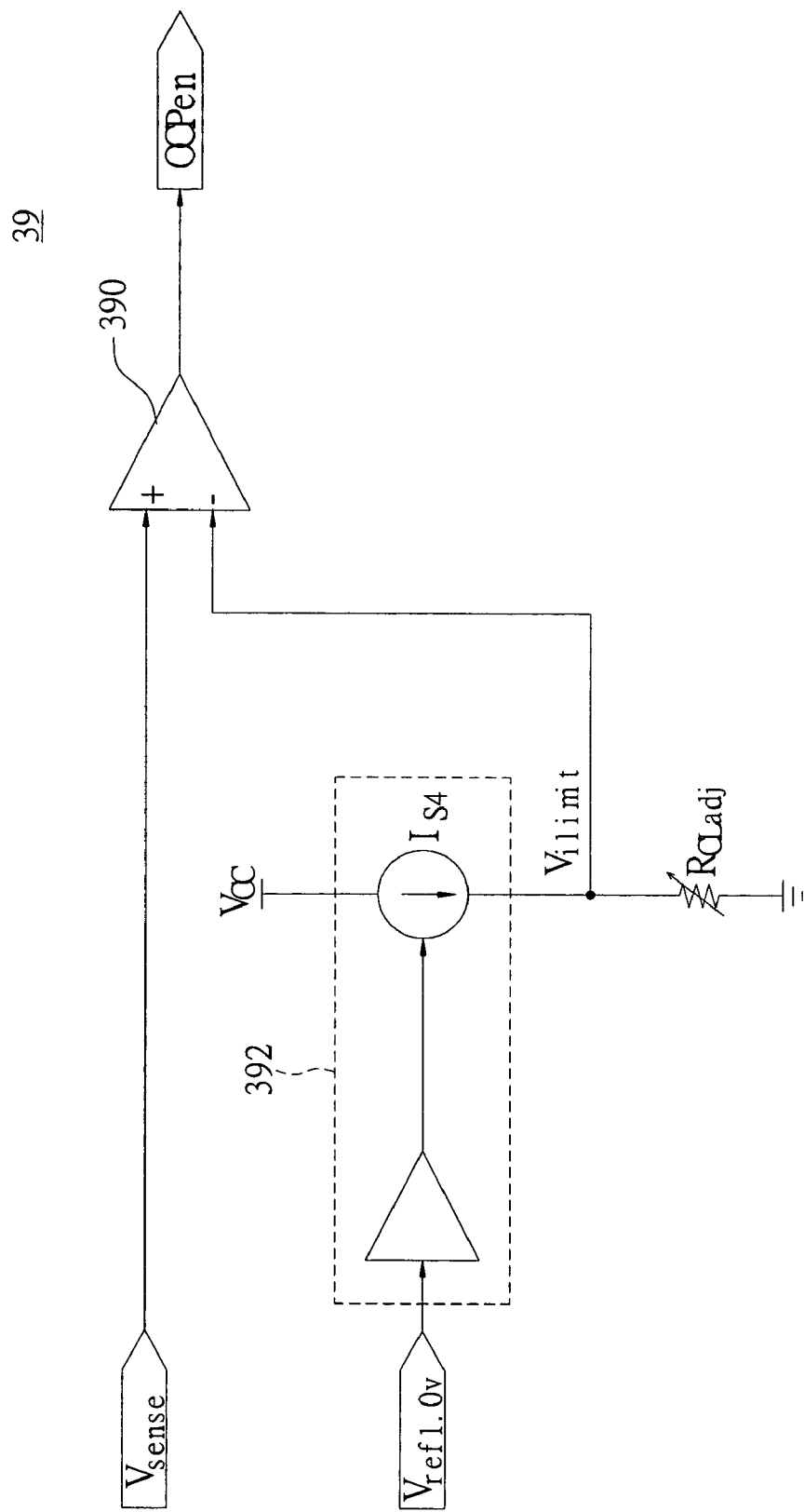
FIG. 11 is a circuit block schematic diagram of the over-current protection unit of the present invention.

Please refer to FIG. 6 again. The high-speed PWM control apparatus with adaptive voltage position 3 further includes an over-current protection unit 39. The over-current protection unit 39 is connected with the compensation unit 30 and the logic control unit 34. Please refer to FIG. 11, which shows a circuit block schematic diagram of the over-current protection unit 39. A voltage-to-current converter 392 obtains a maximum current boundary value Vref$1.0v$ and converts the maximum current boundary value Vref$1.0v$ into a current signal $I_{S4}$. The current signal $I_{S4}$ flows through a variable resistor RCLadj to obtain an over-current comparison voltage Vilimit. The voltage-to-current converter 392 obtains a current detection signal Vsense via the compensation unit 30. The current detection signal Vsense is compared with the over-current comparison voltage Vilimit by a comparator 390 to output an over-current protection signal OCPen to the logic control unit 34.

Figure 7:
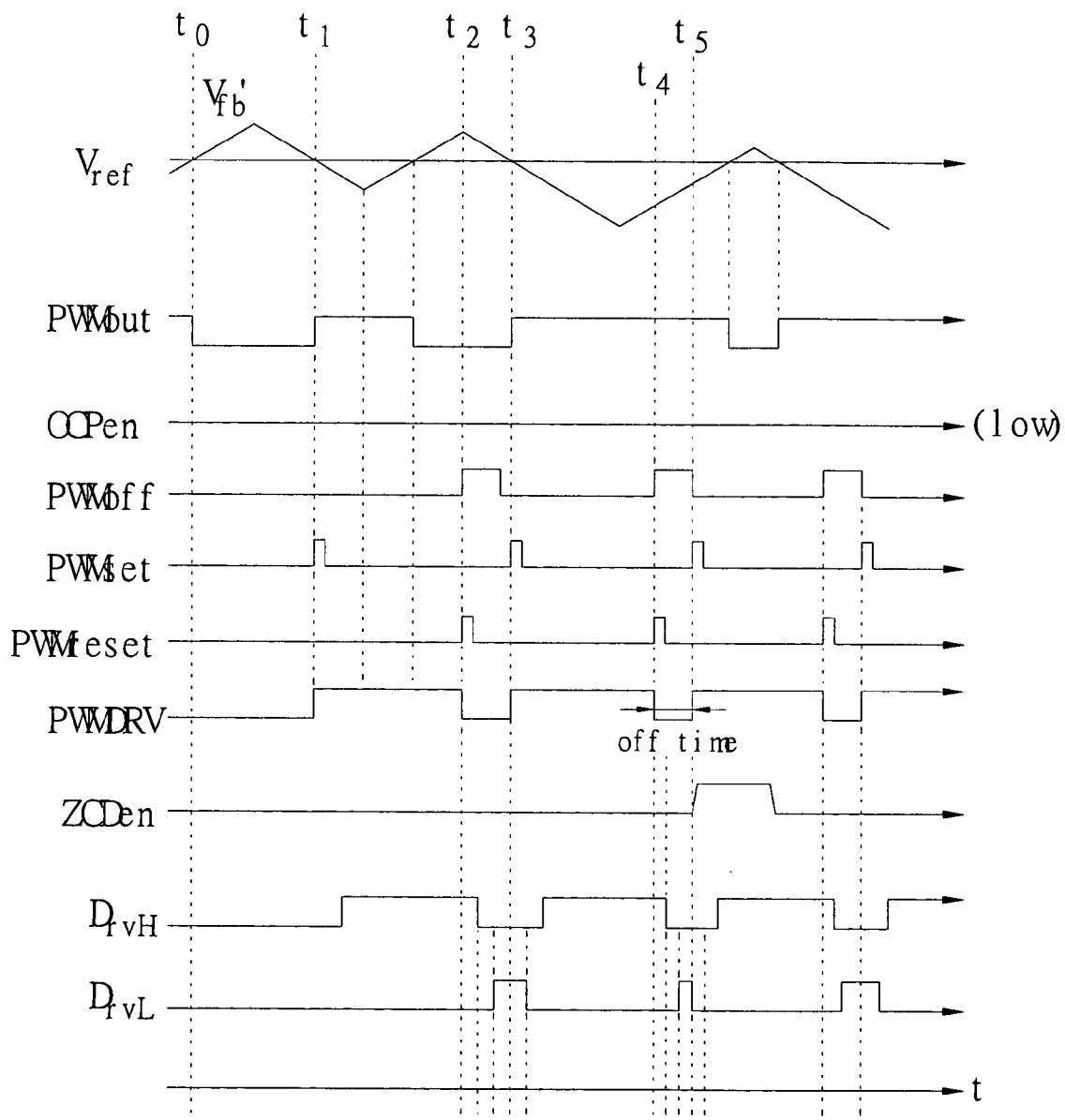
FIG. 7 is a schematic diagram of waveforms of the high-speed PWM control apparatus for an adaptive voltage position of the present invention.

Please refer to FIG. 7, which shows a schematic diagram of waveforms of the high-speed PWM control apparatus with adaptive voltage position of the present invention. Please also refer to FIG. 6. After the circuit operates, the feedback voltage adjusting signal Vfb' is compared with the reference signal Vref to generate the modulation output signal PWMout. During the period of T0–T1, the circuit does not reach the over-current status; the over-current protection signal OCPen is on low level and the PWM off-time signal PWMoff and the modulation output signal PWMout are also on low level. At time T1, the modulation output signal PWMout changes from low level to high level and the PWM set signal PWMset is generated for enabling the PWM driving signal PWMDRV.

After the PWM set signal PWMset is generated, the PWM driving signal PWMDRV lasts a period of on-time Ton and is controlled by the PWM reset signal PWMreset to enter off-time status at time T2. After the PWM reset signal PWMreset is generated, the PWM off-time signal with high level is generated for several hundred nano-seconds and then returns to the low level.

At time T3, the PWM set signal is generated again. After the PWM set signal lasts a period of on-time, the PWM reset signal PWMreset is generated at time T4. The PWM off-time signal with high level is generated again for several hundred nano-seconds. During the period of T4–T5, the modulation output signal PWMout keeps on high level. Because the PWM off-time signal PWMoff remains on high level to delay the output of the PWM set signal PWMset, the output of the modulation output signal PWMout is delayed until the PWM off-time signal PWMoff returns to a low level. By this design, when the loading is heavy, the PWM driving signal PWMDRV still has an off-time for preventing the controlled transistors from being on simultaneously and being burn down. At time T5, the zero current enable signal ZCDen is generated for cutting off the driving signal DrvL to preventing the reverse current from flowing through the transistor that makes the output voltage unstable.

Figure 8:
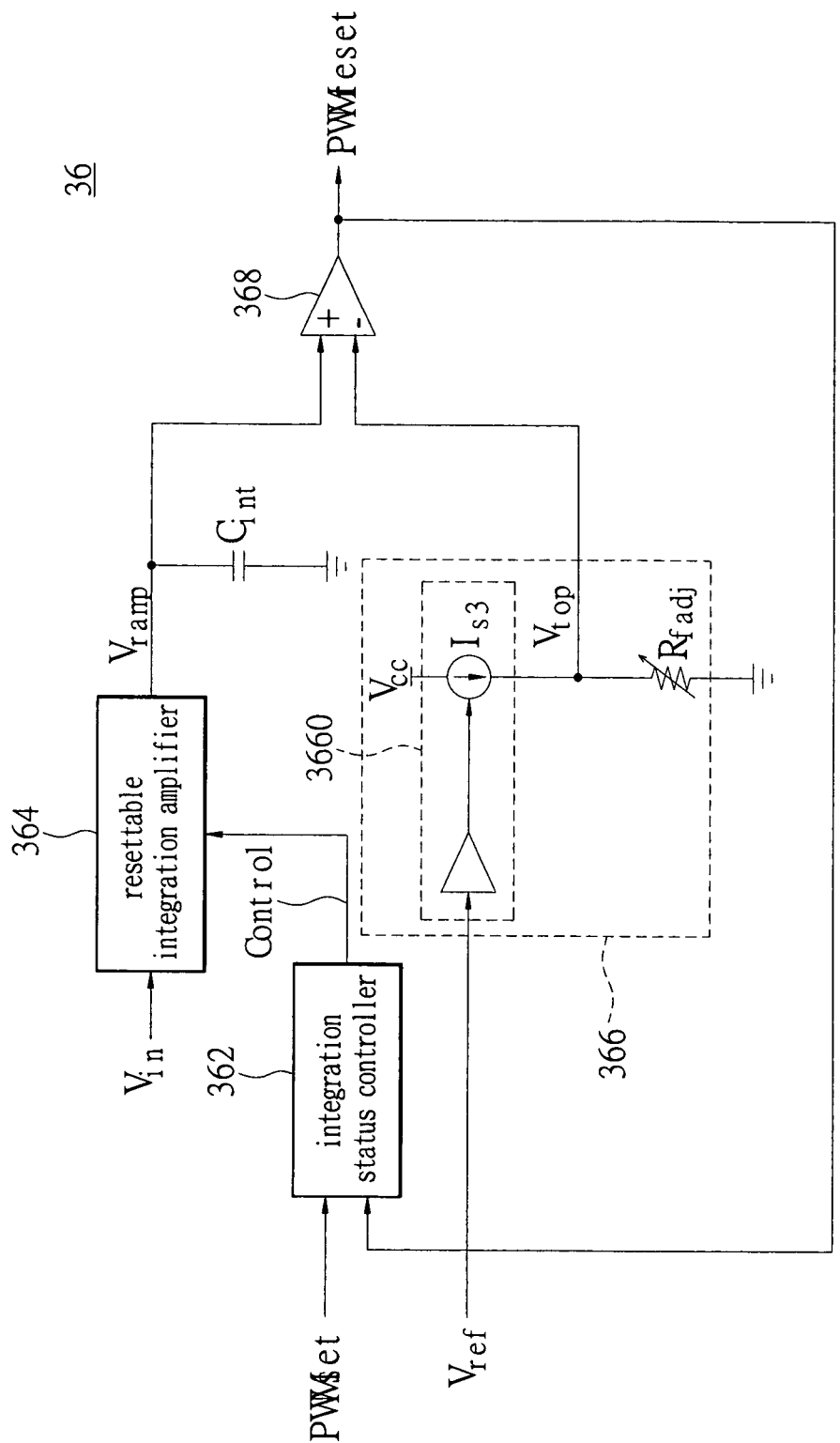
FIG. 8 is a circuit block schematic diagram of the on-time delay control unit of the present invention.

Please refer to FIG. 8, which shows a circuit block schematic diagram of the on-time delay control unit of the present invention. The on-time delay control unit 36 includes a re-settable integration amplifier 364 and an integration status controller 362. The integration status controller 362 is connected with the logic control unit 34 and the re-settable integration amplifier 364. The integration status controller 362 outputs a control signal Control according to the PWM set signal PWMset to control the re-settable integration amplifier 364 and the re-settable integration amplifier 364 outputs an integration output signal Vramp.

An adjustable reference signal generator 366 is used for outputting a reference signal Vtop. A comparator 368 is connected with the re-settable integration amplifier 364, the adjustable reference signal generator 366 and the integration status controller 362 for comparing the integration output signal Vramp with the reference signal Vtop to output the PWM reset signal PWMreset to the integration status controller 362. The integration status controller 362 cuts off the integration operation of the re-settable integration amplifier 364 according to the PWM reset signal PWMreset.

The adjustable reference signal generator 366 is composed of a voltage-to-current transferring circuit 3660 and an adjustable resistor Rfadj that are connected together. The voltage-to-current transferring circuit 3660 converts a reference voltage Vref into a reference current IS3. The reference current IS3 flows through the adjustable resistor Rfadj and generates the reference signal Vtop on the adjustable resistor Rfadj.

Figure 9:
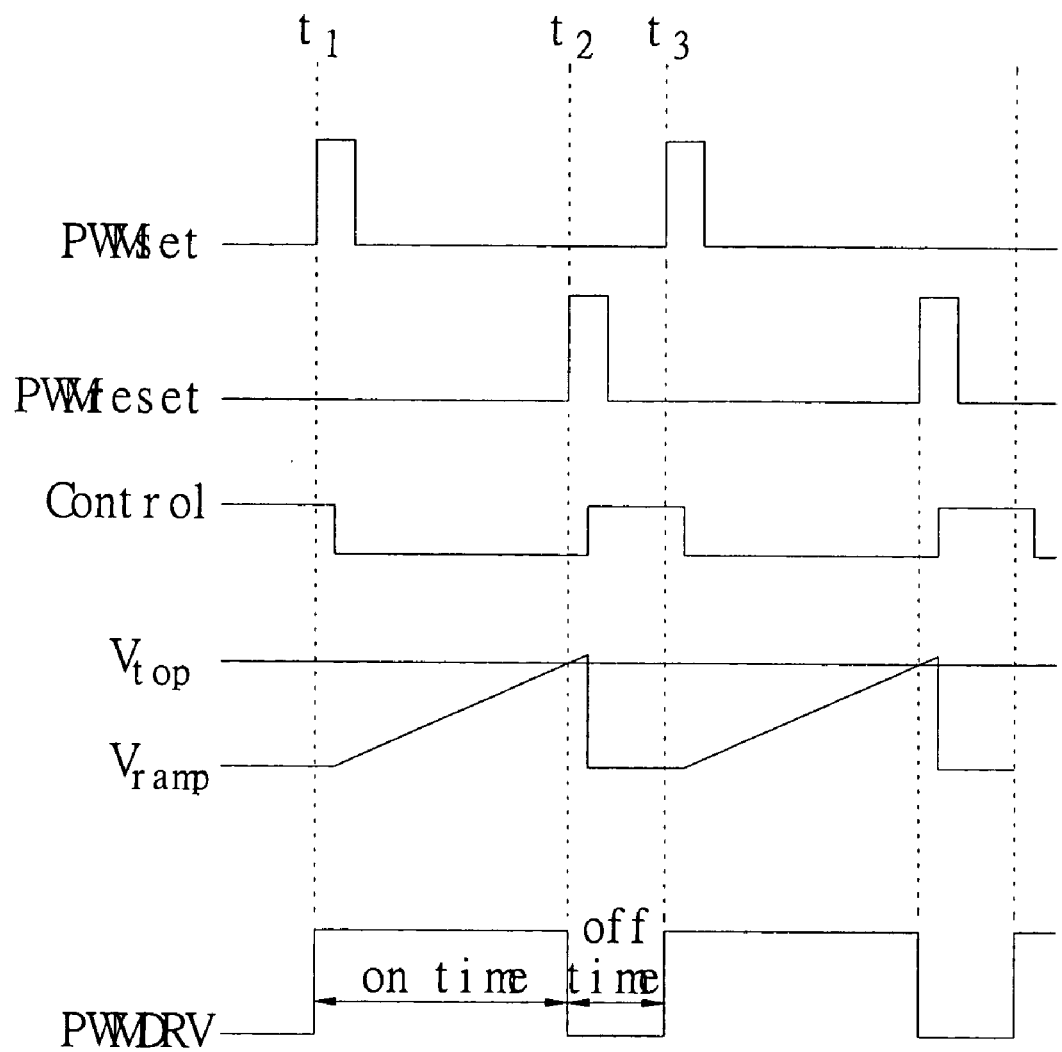
FIG. 9 is a schematic diagram of waveforms of the on-time delay control unit of the present invention.

Please refer to FIGS. 8 and 9. FIG. 9 is a schematic diagram of waveforms of the on-time delay control unit of the present invention. The PWM set signal PWMset is generated at time t1. The PWM set signal PWMset controls the integration status controller 362 to generating a low-level control signal Control. The low level control signal Control makes the re-settable integration amplifier 364 start to integrate to generate the integration output signal Vramp.

When the integration output signal Vramp increases and reaches to the reference signal Vtop, at time t2, the comparator 368 generates the PWM reset signal PWMreset for controlling the integration status controller 362 to generating a high level control signal Control to make the re-settable integration amplifier 364 be reset. At time t3, the PWM set signal PWMset controls the integration status controller 362 again and makes the re-settable integration amplifier 364 restart to integrate to generate the integration output signal Vramp. The on-time period Ton of the PWM driving signal PWMDRV is generated during the period of t1–t2 and The off-time period Toff of the PWM driving signal PWMDRV is generated during the period of t2–t3. The on-time period Ton is obtained by the formula (2).

$$Ton = \frac{Rfadj \times Cint \times Vref \times Gm2}{Vin \times Gm1} \quad (2)$$

In formula (2), the Rfadj is the value of the adjustable resistor; Cint is the capacitance of the capacitor; Vref is the reference voltage; Gm1 is the gain of the re-settable integration amplifier 364; Vin is the input voltage; and Gm2 is the gain of the voltage-to-current transferring circuit 3660. From the above formula, the on-time period Ton is feed-forward by the input voltage Vin and the reference voltage Vref. Therefore, even though the input voltage Vin and the output voltage have been changed, the switching frequency still is unchanged.

Figure 10:
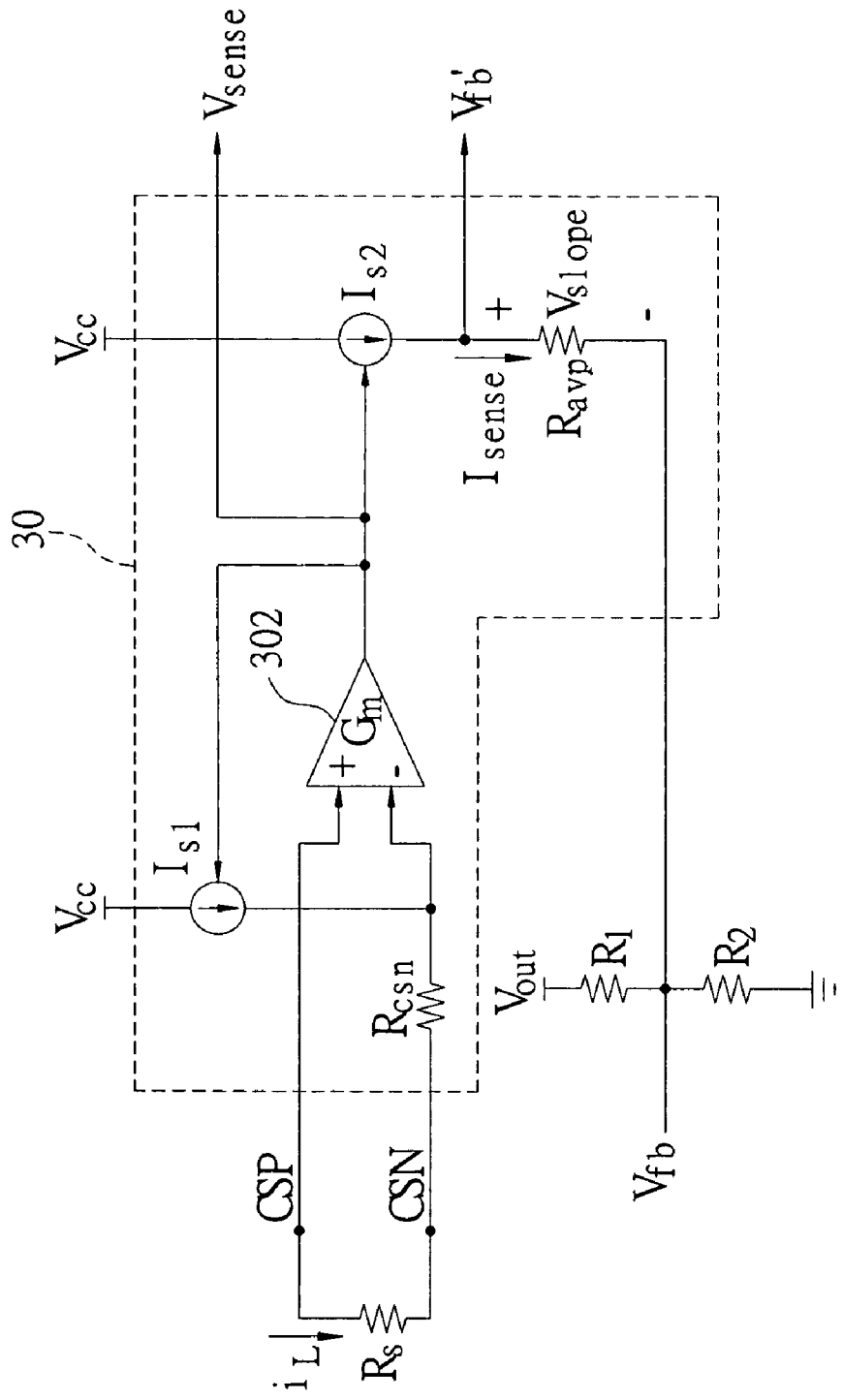
FIG. 10 is a circuit block schematic diagram of the auto-loading voltage position slope compensation unit of the present invention.

Please refer to FIG. 10, which shows a circuit block schematic diagram of the auto-loading voltage position slope compensation unit of the present invention. The compensation unit 30 includes an amplifier 302, a first adjustable current source $I_{S1}$ and a second adjustable current source $I_{S2}$. The input port of the amplifier 302 obtains a current detection signal Vcs from the detection resistor Rs via a first compensation resistor Rcsn for generating an amplified current detection signal Vsense. The first adjustable current source $I_{S1}$ is connected with the output port and the input port of the amplifier 302 and is used for compensating the output of the amplifier 302 according to the amplified current detection signal Vsense. The second adjustable current source $I_{S2}$ is connected with the amplifier 302 and a second compensation resistor Ravp. The second adjustable current source $I_{S2}$ provides current to the second compensation resistor Ravp according to the output signal of the amplifier 302 and generates a compensation voltage signal Vslope on the second compensation resistor Ravp. The compensation voltage signal Vslope is added with the voltage feedback signal Vfb to generate the feedback voltage adjusting signal Vfb'.

Figure 12:
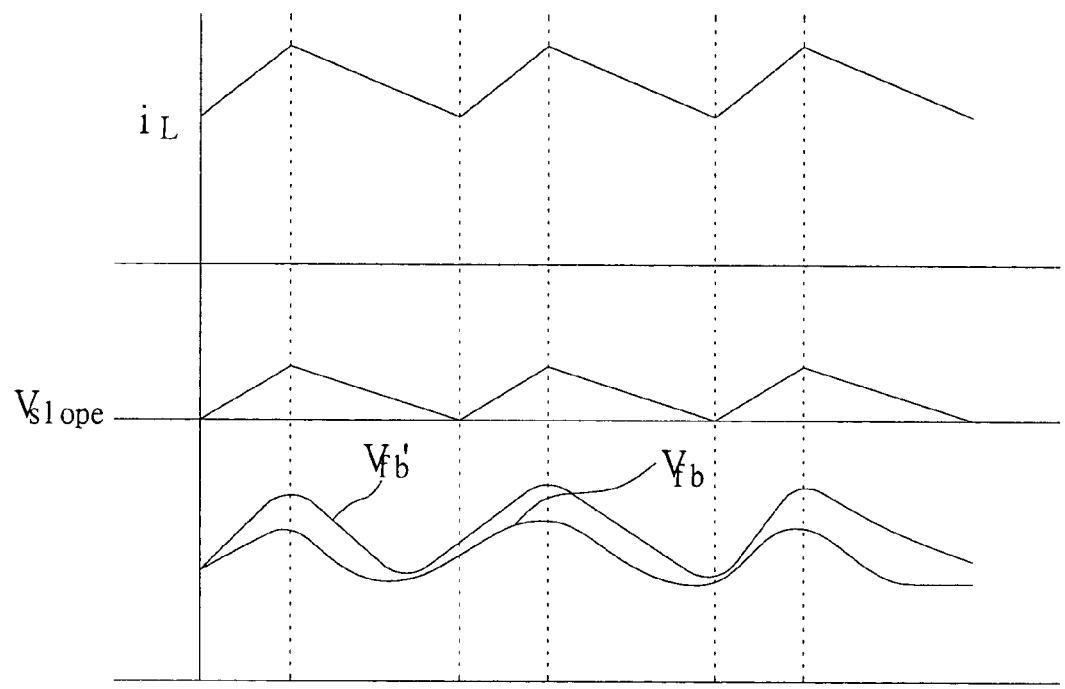
FIG. 12 is a schematic diagram of waveforms of the auto-loading voltage position slope compensation unit of the present invention.

FIG. 12 is a schematic diagram of waveforms of the compensation unit of the present invention. The feedback voltage adjusting signal Vfb' generated from the compensation unit 30 is obtained by formula (3).

$$Vfb' = Vslope + Vfb = (i_{sense} \times R_{avp}) + \left(\frac{R_2}{R_1 + R_2} \times Vout\right) \quad (3)$$

In the formula, Vslope is the compensation voltage signal Vslope; Vfb is the voltage feedback signal; $i_{sense}$ is the current flowing through the second compensation resistor; Vout is the output voltage. The current $i_{sense}$ flowing through the second compensation resistor is obtained from the formula (4).

$$i_{sense} = i_L \times \frac{R_s}{R_{csn}} \quad (4)$$

In the formula, Rs is the resistance of the detection resistor; $i_L$ is the current flowing through the detection resistor RS and the Rcsn is the resistance of the first compensation resistor.

From the formulas (3) and (4), the value of the compensation voltage Vslope and the slope Rdroop of the compensation voltage signal Vslope are obtained, such as formulas (5) and (6).

$$Vslope = i_L \times \frac{R_s}{R_{csn}} \times R_{avp} \quad (5)$$

$$Rdroop = \frac{R_{avp}}{R_{csn}} R_s \quad (6)$$

Figure 13:
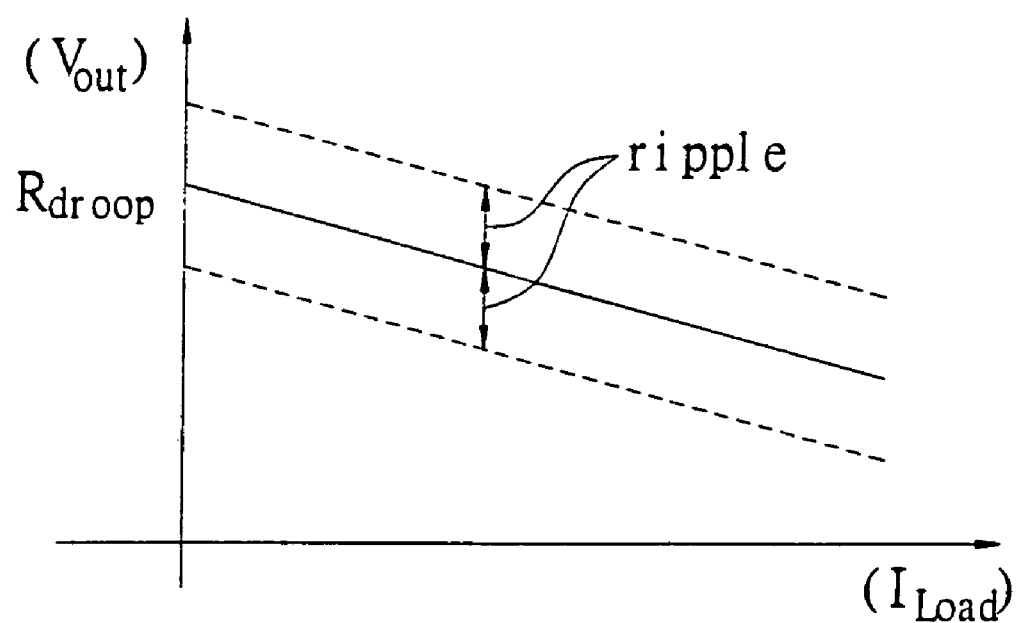
FIG. 13 is a schematic diagram of the load line of the present invention.

Therefore, the slope Rdroop of the compensation voltage Vslope is changed by adjusting the first compensation resistor Rcsn, the second compensation resistor Ravp and the detection resistor Rs. Therefore, the auto-loading voltage position adjustment is achieved. The slope Rdroop of the loading is showed in FIG. 13. The slope Rdroop of the loading that has a relative proportion is easily obtained by adjusting the first compensation resistor Rcsn and the second compensation resistor Ravp, rather than being obtained only from the second compensation resistor Ravp. It is easier to integrate the circuit into an IC.

The present invention adopts a high-speed PWM control apparatus with adaptive voltage position and its driving signal generating method. The present invention automatically detects the change of the loading and adjusts the voltage position simultaneously for stabilizing the voltage, and the loading output power consumption is also reduced when current increases. When the circuit recovers from a heavy loading to a light loading, the present invention prevents the over-shoot of the loading from being produced. Therefore, the circuit components, such as output capacitor, the inductor and the power transistor etc., can be reduced. Therefore, the cost of the component is reduced.

The present invention does not need to use the frequency of clock signal to generate a driving signal and does not need to use an error amplifier to control the modulation. Therefore, the present invention has a fast transient response that reacts to the change of the loading instantaneously and stably. When the apparatus is on a continuous conduction mode (CCM), the switching frequency of the controller is still fixed even though the input voltage Vin and the output voltage Vout are changed. The electrical-magnetic noise disturbance is also improved.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A high-speed PWM control apparatus with adaptive voltage position, used in a DC—DC power transfer device, comprising:
    an auto-loading voltage position slope compensation unit, obtaining a current detection signal and a feedback voltage signal via a detection resistor, and automatically outputting a feedback voltage adjusting signal;
    an error signal comparison unit, connected with the compensation unit, for comparing the feedback voltage adjusting signal with a reference signal to output a modulation output signal;
    a logic control unit, connected with the error signal comparison unit, for receiving the modulation output signal and outputting a PWM setting signal;
    an on-time delay control unit, connected with the logic control unit, the input voltage and the reference voltage, for generating a PWM reset signal according to the PWM setting signal, the input voltage and the reference voltage;
    a flip-flop, connected with the logic control unit and the on-time delay control unit, for outputting a PWM driving signal according to the PWM setting signal and the PWM reset signal;
    a driving unit, connected with the flip-flop, for receiving the PWM driving signal to output a pair of complementary driving signals; and
    an off-time delay control unit, connected with the flip-flop and the logic control unit, for generating a PWM off-time signal according to the PWM driving signal and transmitting the PWM off-time signal to the logic control unit;
    thereby, when the loading is changed, the PWM control apparatus generates the PWM setting signal instantaneously to respond rapidly to the change of the loading and the power supply is stabilized.

2. The high-speed PWM control apparatus for an adaptive voltage position as claimed in claim 1, further comprising an over-current protection unit, connected with the compensation unit and the logic control unit, for obtaining an amplified current detection signal via compensation unit, the amplified current detection signal is compared with a maximum current boundary value to output an over-current protection signal.

3. The high-speed PWM control apparatus with adaptive voltage position as claimed in claim 2, wherein the maximum current boundary value is obtained from modulating an over-current adjustable resistor.

4. The high-speed PWM control apparatus with adaptive voltage position as claimed in claim 1, further comprising a zero current detection unit, connected with the compensation unit and the driving unit, for obtaining an amplified current detection signal via the compensation unit, the amplified current detection signal is compared with a zero current boundary value to output a zero-current enable signal to the driving unit.

5. The high-speed PWM control apparatus with adaptive voltage position as claimed in claim 1, wherein the compensation unit and the driving unit comprises:
    an amplifier, an input port of the amplifier obtains the current detection signal via a first compensation resistor for generating an amplified current detection signal;
    a first adjustable current source, connected with the output port and the input port of the amplifier, for compensating the output of the amplifier according to the amplified current detection signal; and
    a second adjustable current source, connected with the amplifier and a second compensation resistor, the second adjustable current source provides current to the second compensation resistor according to the output signal of the amplifier and generates a compensation voltage signal on the second compensation resistor, the compensation voltage signal is added with the voltage feedback signal to generate the feedback voltage adjusting signal.

6. The high-speed PWM control apparatus with adaptive voltage position as claimed in claim 5, wherein the slope of the loading is determined by the detection resistor, the first compensation resistor and the second compensation resistor.

7. The high-speed PWM control apparatus with adaptive voltage position as claimed in claim 5, wherein the slope of the loading is equivalent to the resistance of the second compensation resistor multiplied by the resistance of the detection resistor, then divided by the resistance of the first compensation resistor.

8. The high-speed PWM control apparatus with adaptive voltage position as claimed in claim 1, wherein the on-time delay control unit comprises:
- a re-settable integration amplifier;
- an integration status controller, connected with the logic control unit and the re-settable integration amplifier, for controlling the re-settable integration amplifier according to the PWM set signal to make the re-settable integration amplifier output an integration output signal;
- an adjustable reference signal generator, for outputting a reference signal; and
- a comparator, connected with the re-settable integration amplifier, the adjustable reference signal generator and the integration status controller, for comparing the integration output signal with the reference signal to output the PWM reset signal to the integration status controller;
- wherein, the integration status controller cuts off the integration operation of the re-settable integration amplifier according to the PWM reset signal.

9. The high-speed PWM control apparatus with adaptive voltage position as claimed in claim 8, wherein the adjustable reference signal generator comprises:
- a voltage-to-current transferring circuit, converting a reference voltage Vref into a reference current; and
- an adjustable resistor, connected with the voltage-to-current transferring circuit, for generating the reference signal according to the reference current.

10. A driving signal generating method of a high-speed PWM control apparatus with adaptive voltage position, used for controlling a DC—DC power converter, comprising:
- detecting the change of the loading via a detection resistor for automatically generating a feedback voltage adjusting signal;
- comparing the feedback voltage adjusting signal with a reference signal to generate a modulation output signal;
- calculating logically the modulation output signal and a PWM off-time signal to generate a PWM set signal and the PWM set signal enable and generate a driving signal; and
- delaying and generating a PWM reset signal according to the PWM set signal, an input voltage and a reference voltage to reset the driving signal.

11. The driving signal generating method of a high-speed PWM control apparatus with adaptive voltage position as claimed in claim 10, after the driving signal is reset, the PWM off-time signal is generated.

12. The driving signal generating method of a high-speed PWM control apparatus with adaptive voltage position as claimed in claim 10, wherein the step of calculating logically the modulation output signal and a PWM off-time signal further comprises a step of calculating logically an over-current protection signal, the modulation output signal and a PWM off-time signal to generate the PWM set signal.

13. The driving signal generating method of a high-speed PWM control apparatus with adaptive voltage position as claimed in claim 10, further comprising a step of detecting a zero current, that compares an amplified current detection signal with a zero current boundary value to output a zero current enable signal to a driving unit for controlling and adjusting the driving signal outputted from the driving unit.

* * * * *